United States Patent [19]

Hsu

[11] Patent Number: 5,531,395
[45] Date of Patent: Jul. 2, 1996

[54] STOPPING DEVICE FOR TAPE MEASURES

[75] Inventor: Cheng-Hui Hsu, Tien, Taiwan

[73] Assignee: Pro-Techtor International

[21] Appl. No.: 357,691

[22] Filed: Dec. 16, 1994

[51] Int. Cl.⁶ .................................................. B65H 75/48
[52] U.S. Cl. .................................... 242/381.6; 242/396.6; 33/767
[58] Field of Search .................................. 242/381, 381.6, 242/396, 396.5, 396.6, 396.7, 396.8; 33/767

[56] References Cited

U.S. PATENT DOCUMENTS

| | | | |
|---|---|---|---|
| 3,114,515 | 12/1963 | Kane | 33/767 |
| 3,289,969 | 12/1966 | Purbaugh | 242/381.6 |
| 3,415,461 | 12/1968 | Zelnick | 242/396.6 |
| 3,462,096 | 8/1969 | Bailey et al. | 242/381 |
| 3,463,416 | 8/1969 | Quenot | 242/396.5 |
| 4,687,155 | 8/1987 | Burton | 242/381 |
| 5,112,005 | 5/1992 | Hoshihara | 242/381 |

FOREIGN PATENT DOCUMENTS 882640  11/1961  United Kingdom ..................... 33/767

Primary Examiner—John P. Darling

[57] ABSTRACT

A stopping device for tape measures, consisting of a lower housing, a locking button, a spring, a tape roller and an upper housing, arranged in such a way that when the locking button is pushed upwards, the lower part of the stopping spring is released from the outer stopping rim of the tape roller which allows the tape to be retracted automatically using the tension of the helical spring of the tape roller, and releasing the locking button allows the tension of the helical spring to return to its initial position, thereby pressing against the outer stopping rim on one side of the tape roller and providing the mechanism for stopping it.

1 Claim, 5 Drawing Sheets

STOPPING DEVICE FOR TAPE MEASURES

BACKGROUND OF THE INVENTION

The present invention relates to a stopping device for tape measures, more particularly, to an improved stopping device by means of which the speed of the returning tape can be attenuated, thereby preventing injuries due to excessively rapid retraction of the tape and thereby also prolonging the service life of the tape measure.

In using a conventional tape measure, the operator extends the tape to the desired length, proceeds with the measurement, and then releases the locking button, which allows the tape to retract. The tape measure is equipped with a coil spring, which provides a strong force for retracting the tape. In addition, the returning speed of the tape increases the longer its extension, which is undesirable in that the tape, which is made of metal, may cause injuries to the hand. The means employed in conventional tape measures for slowing the retracting tape or holding the tape in place involves pressing the locking button downward, thereby allowing the lower part of the locking button to come into contact with the tape. This method of controlling the tape is inefficient and, moreover, the surface of the tape is subject to scoring. In light of the shortcomings of conventional tape measures, the inventor conducted repeated and diligent research, aided by many years of experience in the tape measure manufacturing industry, and arrived at the present invention after discovering an improved novel stopping device for tape measures.

More specifically, the principal objective of the present invention is to offer a stopping device for tape measures with which the tape can be controlled more effectively and the speed of the returning tape can be attenuated, thereby promoting safety and extending the service life of the tape measure.

The present invention is explained in detail by means of the following practical example, along with the illustrative drawings.

DESCRIPTION OF THE PREFERRED EMBODIMENT

Figure 1:
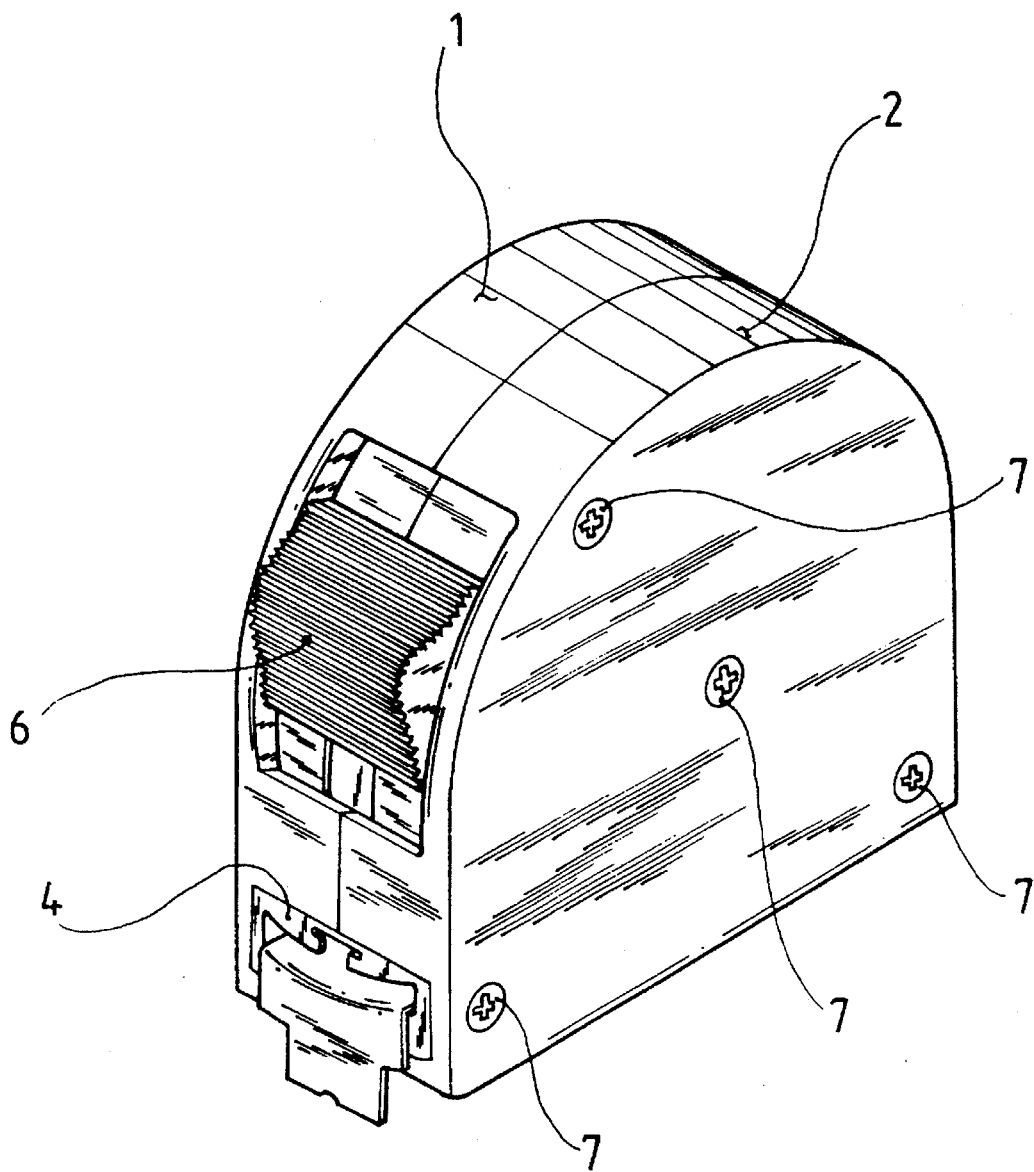
FIG. 1: A drawing showing the components of the tape measure of the present invention.
Figure 2:
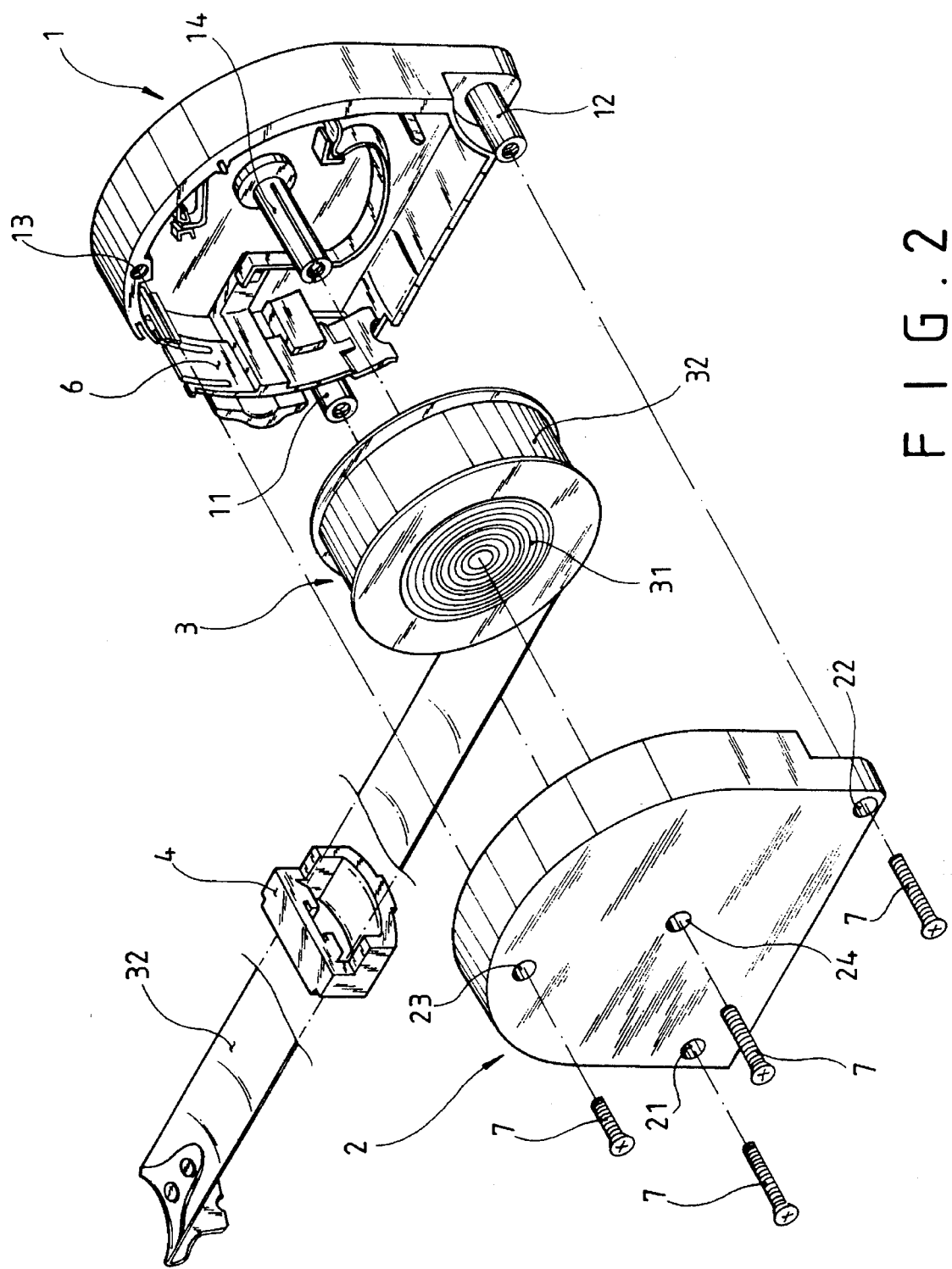
FIG. 2: A three-dimensional dissection drawing of the tape measure of the present invention.

As shown in FIGS. 1 and 2, the tape measure of the present invention is equipped with a tape roller 3 onto which a concentric helical spring 31 is coiled. Its outer part, in turn, is coiled with the tape 32. The center of the helical spring 31 of the tape roller 3 is inserted into the center shaft 14 in the lower housing 1. The front of the tape 32 is equipped with a stopping piece 4 mounted at the lower front section of the lower housing 1 and in the upper housing 2. The upper housing 2 is mounted onto the lower housing 1 by means of four screws 7 inserted through screw holes 21, 22 and 23 and center mounting screw hole 24 into the mounting rods 11 and 12, mounting screw hole 13 and center shaft 14.

Figure 3:
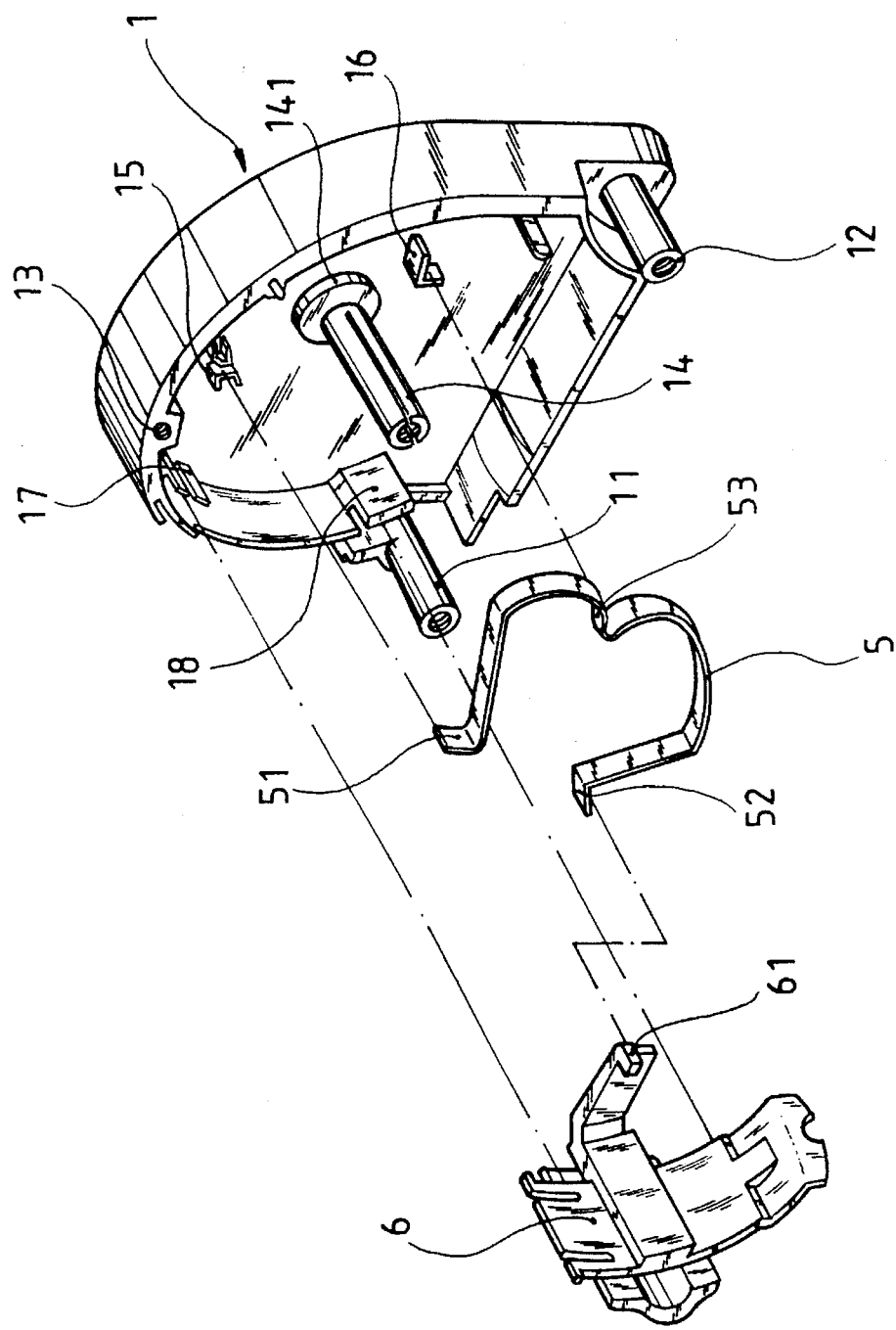
FIG. 3: A drawing showing the stopping device for the present invention.

As shown in FIG. 3, the stopping device of the present invention involves inserting the mounting end 51 of a "3"-shaped stopping spring 5 into an "X"-shaped mounting piece 15 into the lower housing 1, and inserting the mounting section 53 into a "G"-shaped stopping piece 16. A locking button 6 is then inserted into the mounting pieces 17 and 18 on the lower housing 1, and an "L"-shaped protruding mounting piece 61 of the locking button 6 is mounted on top of the mounting end 52 of the stopping spring 5, as shown in FIG. 2.

Figure 4:
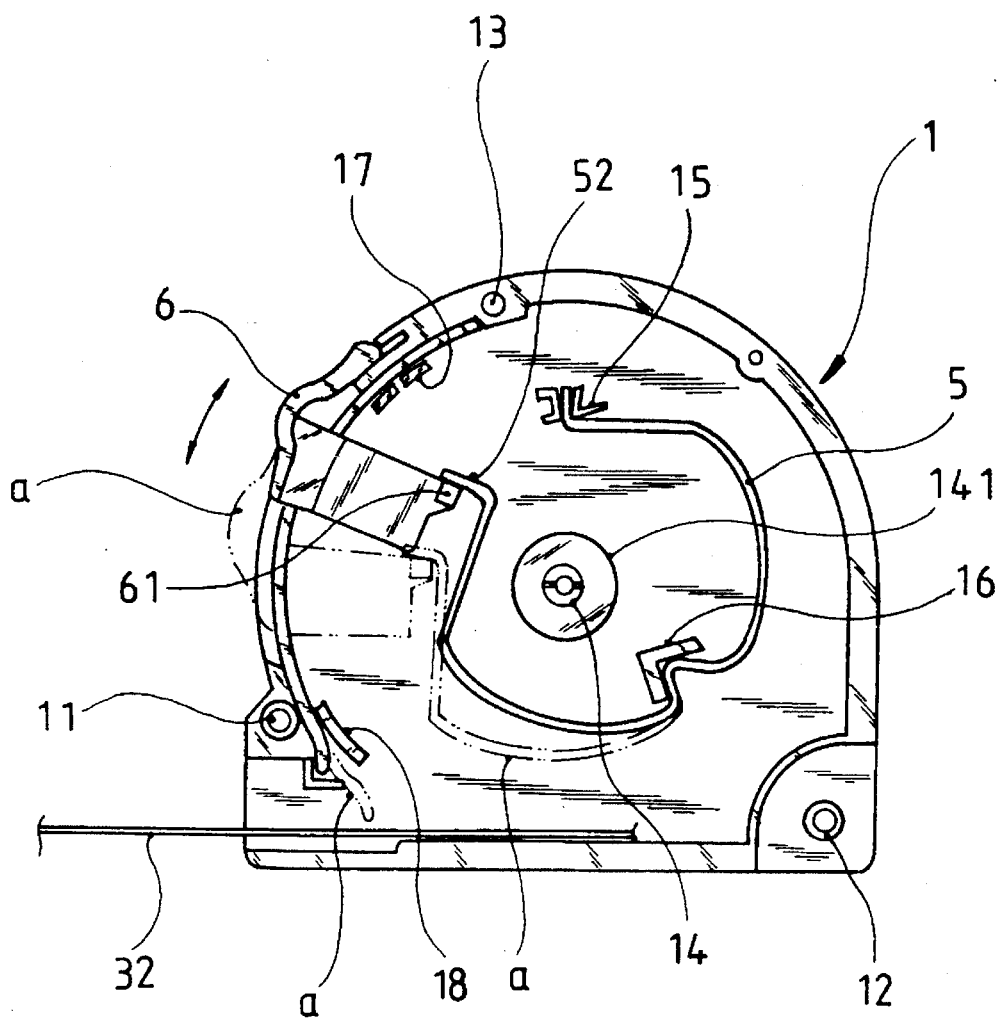
FIG. 4: A drawing showing the action of the stopping device of the present invention.

FIG. 4 shows the action of the locking button 6 and stopping spring 5 of the present invention. When the locking button 6 is pushed upward, the protruding piece 61 of the locking button 6 also moves upward which, in turn, causes the mounting end 52 of the stopping spring 5 to move forward. When the locking button 6 is released, the tension from the stopping spring 5 returns the locking button 6 and stopping spring 5 to their initial positions, as shown in "a" of FIG. 4.

Figure 6:
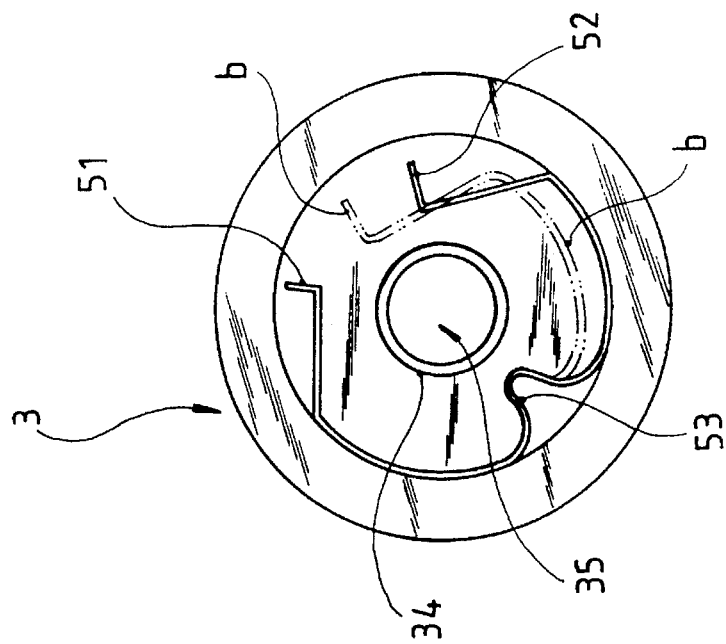
FIG. 6: A drawing showing the action of the stopping spring of the tape measure of the present invention.
Figure 5:
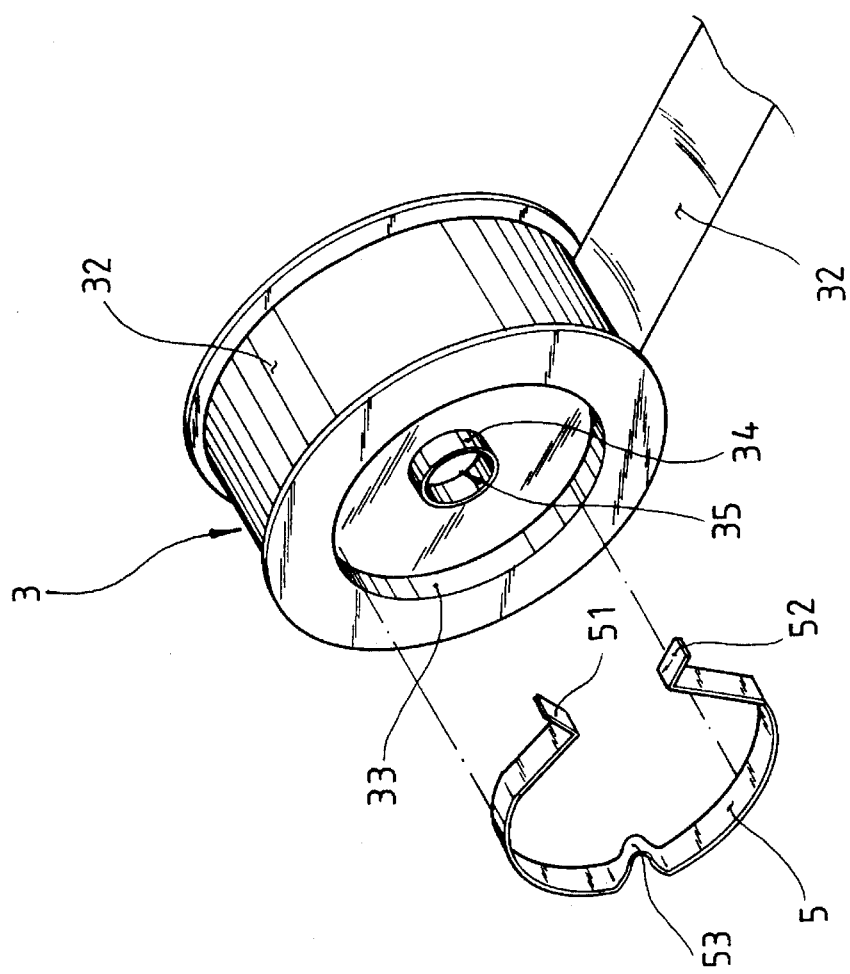
FIG. 5: A drawing showing the stopping spring and tape roller of the tape measure of the present invention.

As shown in FIGS. 5 and 6, the other side of the tape roller 3 is equipped with a recessed circular slot, possessing an outer stopping rim 33 and a round protruding rim 34 at the center of said circular slot. The round protruding rim 34 is equipped with a center shaft through hole 35. Furthermore, the stopping spring 5 is mounted snugly inside the outer stopping rim 33 of the recessed circular slot of the tape roller 3. As shown in FIGS. 2, 3 and 4, the stopping spring 5 is first mounted onto the lower housing 1, the tape roller 3 is then inserted into the center shaft 14 of the lower housing 1. Meanwhile, the center shaft through hole 35 of the tape roller 3 is placed into the protruding rim 141 of the lower part of the center shaft 14, so that the tape roller 3 can be turned freely. Furthermore, the stopping spring 5 is mounted inside the circular slot on the other side of the tape roller 3. As shown in FIGS. 4 and 6, the stopping device of the present invention involves pushing the locking button 6 upward, thereby causing the lower part of the stopping spring 5 to be released from the outer stopping rim 33 of the tape roller 3, as shown in "b" of FIG. 6 and allowing the tape 32 to be retracted automatically using the tension of the helical spring 31. When the locking button 6 is released, the tension of the helical spring 31 causes it to return to its initial position, thereby pressing against the outer stopping rim 33 and providing the means of stopping the tape roller 3.

As shown above, the stopping device for tape measures according to the present invention is novel and possesses practical industrial value.

What is claimed is:

1. A stopping device for tape measures, consisting of (a) a lower housing equipped with a mounting rod on each of two lower sides thereof, a center shaft at its center and a protruding rim at the bottom of said center shaft, an "X"-shaped mounting piece and "G"-shaped mounting piece, and a mounting piece on the upper and lower part of one side of an arc-shaped housing rim, (b) a locking button, which has an "L"-shaped protruding mounting piece on one side, mounted onto the mounting pieces on the upper and lower part of one side of the arc-shaped housing rim, (c) a stopping spring, which has a "3"-shaped configuration, with an upper end being mounted inside the "X"-shaped mounting piece of the lower housing, a middle mounting piece being mounted onto the "G"-shaped mounting piece of the lower housing and, a lower end being mounted onto the "L"-shaped protruding mounting piece on one side of the locking button, (d) a tape roller equipped with an inner helical spring and an outer measuring tape, with one side of the tape roller being equipped with a recessed circular slot, possessing an outer stopping rim and a round protruding rim at the center of said circular slot, the round protruding rim being equipped with a center shaft through hole a front side of the tape measure being equipped with a stopping piece, the center of the helical spring of the tape roller being inserted into the center shaft of the lower housing, the stopping spring being mounted inside the circular slot on one side of the tape roller, and the center shaft through hole of the tape roller being mounted into the protruding rim of the lower part of the center shaft of the lower housing, and (e) an upper housing mounted onto the aforementioned lower housing by means of four screws inserted through screw holes a center mounting screw hole into the mounting rods, a mounting screw hole and the center shaft of the lower housing, in such a way that when the locking button is pushed upwards, the lower part of the stopping spring is released from the outer stopping rim of the tape roller, allowing the tape to be retracted automatically using the tension of the helical spring of the tape roller; release of the locking button allows the tension of the helical spring to return to its initial position, which presses against the outer stopping rim on one side of the tape roller, thus providing the means for stopping the tape roller.

* * * * *

UNITED STATES PATENT AND TRADEMARK OFFICE
CERTIFICATE OF CORRECTION

PATENT NO. : 5,531,395
DATED : Jul. 2, 1996
INVENTOR(S) : HSU, CHENG-HUI

It is certified that error appears in the above-identified patent and that said Letters Patent is hereby corrected as shown below:

On the cover page, item 73, Assignee, should read --There is no Assignee for this patent.--

On the cover page, "Attorny, Agent or Firm" should read --Pro-Techtor International--.

Signed and Sealed this

First Day of June, 1999

Attest:

Attesting Officer

Q. TODD DICKINSON

Acting Commissioner of Patents and Trademarks